455-603 AU 233 EX
FIP8106 OR 3,740,560

United States Patent [19] [11] 3,740,560
Wentz [45] June 19, 1973

[54] COMMUNICATION MEANS

[75] Inventor: John L. Wentz, Ellicott City, Md.

[73] Assignee: Westinghouse Electric Corporation, Pittsburgh, Pa.

[22] Filed: Sept. 8, 1971

[21] Appl. No.: 178,601

[52] U.S. Cl. .................. 250/199, 350/169
[51] Int. Cl. .................. H04b 9/00
[58] Field of Search .................. 250/199; 350/169, 350/171, 174

[56] References Cited

UNITED STATES PATENTS

| | | | |
|---|---|---|---|
| 3,506,834 | 4/1970 | Buchsbaum et al. | 250/199 |
| 3,532,890 | 10/1970 | Denton | 250/199 |
| 3,501,223 | 3/1970 | Rack | 350/171 |
| 3,586,997 | 6/1971 | Kinsel | 250/199 X |

*Primary Examiner*—Benedict V. Safourek
*Attorney*—F. H. Henson, E. P. Klipfel and J. L. Wiegreffe

[57] ABSTRACT

There is disclosed optical communication apparatus for transferring digital information at high rates, as high as $10^{10}$ bits per second. The communication channel is a mode-or phase-locked CW laser which generates optical pulses of very short duration, typically of $10^{-9}$ seconds, at short intervals. Typically $10^8$ pulses are transmitted per second. Each pulse is subdivided into time-spaced sub-pulses by beam splitters and each sub-pulse, in its turn, is incident on one of an array of electro-optic cells. The cells are electrically modulated in accordance with the intelligence to be communicated. For ten cells there are a total of $10^9$ sub-pulses per second each pulse carrying a bit of information. In transmission to a receiver the sub-pulses overlap to produce a beam. The receiver includes a line scanner which converts the timed distribution of the sub-pulses into spaced distribution. The beam scans an array of photomultiplier detectors which derive the intelligence from the beam.

7 Claims, 12 Drawing Figures

COMMUNICATION MEANS

CROSS REFERENCE TO RELATED DOCUMENTS

The following documents are incorporated herein by reference:

1. U.S. Pat. No. 3,429,636
2. U.S. Pat. No. 3,460,885
3. Novel Laser Q-Switching Mechanism — J. L. Wentz — Journal of IEEE, June, 1964, Vol. 52, No. 6, Page 716.
4. A Non-Reciprocal Electro-optic Device — John L Wentz — Journal of the IEEE, January, 1966, Vol. 54, No. 1, Page 97.
5. Mode Locking a Nd:YAG Laser — James H. Boyden — MICROWAVES — March, 1971, Page 58.

Items 1, 2, 3 and 4 are herein called "Wentz." Item 5 is herein called "Boyden."

BACKGROUND OF THE INVENTION

This invention relates to communication and has particular relationship to communication by appropriately modulated beams of radiation. A ramification of the development and growth of the digital computer art has been a demand for high-speed communication of digital intelligence. The desired high speed has not been achieved in accordance with the teaching of the prior art and it is an object of this invention to overcome the communication-speed limitation of the prior art and to provide facilities for communicating intelligence at a high speed.

SUMMARY OF THE INVENTION

This invention arises from the realization that it is feasible to deflect a beam of radiant energy periodically at a high rate of the order of $10^8$ cycles per second and that when a beam is deflected at such a rate, the time delay between successive parts of the beam resulting from path lengths differing only by a few centimeters can, notwithstanding the high speed of electromagnetic radiation, serve to separate such successive parts as channels for transmitting information. In accordance with this invention each pulse of a train of pulses of radiant energy is at a transmitter sub-divided by beam splitters into a time succession of spatially distributed sub-pulses. Intelligence is impressed in each sub-pulse and then the sub-beams constituting the separate sub-pulses are converged during transmission to a receiver to form a beam which is made up of a train of overlapping successive sub-pulses. At the receiver this beam is periodically deflected at a high rate to produce a spatial distribution of sub-pulses which is converted into signals by appropriately-spaced radiant-energy responsive means.

Stated another way, in the transmission of a digital information, bit rates of the order of $10^{10}$ bits per second can be achieved by optical means through the use of a mode (or phase) locked CW laser operating in conjunction with an array of N electro-optic light modulators (EOLM) and detectors. The apparatus system according to this invention provides N separate optical communication channels or a single channel with a capacity of $N \times M$ bits per second, where M is the mode locking frequency. In effect, the invention possesses the capability of transferring an N bit word M times per second. The mechanism by which this high-speed transfer is realized is based upon an optical signal processing technique which converts spatial modulation to temporal modulation at the optical transmitter and temporal modulation to spatial modulation at the receiver.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

Figure 8:
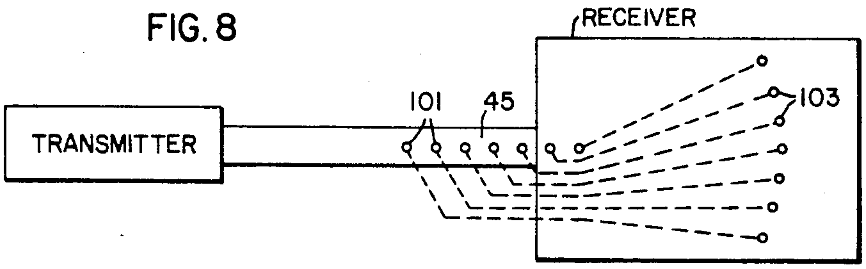
Figure 9:
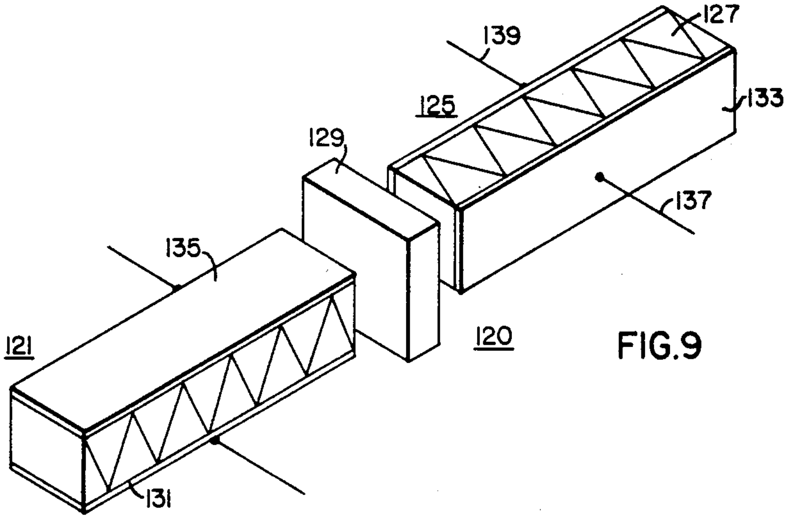
Figure 10:
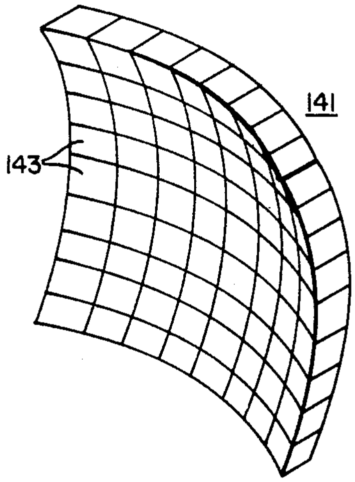

FIGS. *7a* and *7b* are related graphs showing the manner in which the scanning of the responsive devices is synchronized;

FIG. 8 is a diagrammatic view showing the manner in which the time distribution of sub-pulses is converted into a spatial distribution; and FIGS. 9 and 10 show the time-to-spatial distribution components of a modification of this invention.

DETAILED DESCRIPTION OF EMBODIMENTS

The apparatus shown in the drawings are an optical communication system including a transmitter 11 and a receiver 13. The transmitter 11 includes mode-locked CW laser generator 15 which serves to provide a source of pulses of electro-magnetic radiation. Typically, this radiation is in or near the visible range (4,000 to 10,000 angstroms). The transmitter 11 also includes a beam-splitter assembly 17 which divides each of the pulses emitted by a generator 15 into an array of spatially separated sub-pulses and a modulator 19 which serves to impress digital intelligence on each of the sub-pulses.

The generator 15 includes a laser rod 21 (or other lasing medium) (FIG. 2) which is supplied with radiation from a primary source (not shown) such as a high-power lamp. The generator 15 also includes an end reflector 23 and an output reflector 25. The radiation emitter by the rod 21 is limited by adjustable aperture 27. A phase modulator 29 is interposed between the aperture 27 and the output reflector 25. The phase modulator 29 is energized from a phase modulator source 31. The radiation from the rod 21 passes through the phase modulator 29 and is internally phase modulated at a frequency approximately equal to the axial-mode spacing frequency of the optical resonator disclosed.

At a particular phase modulation depth the axial modes becomes phase coherent (or phase locked) and the laser breaks into a pulse regenerative mode of operation. Pulse operation results from the fact that by phase locking the various axial modes present in the laser resonator, the frequency spectrum of an optical pulse is synthesized; and consequently, in the time domain an optical pulse is generated.

Figure 4A:
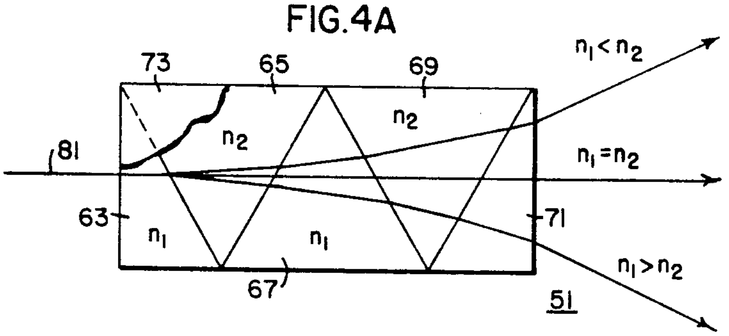
FIGS. 4A and 4B are schematic views in side and end elevation respectively of an optical scanner of the transmitter shown in FIGS. 2 and 3.
Figure 4B:
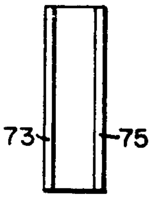
Figure 5:
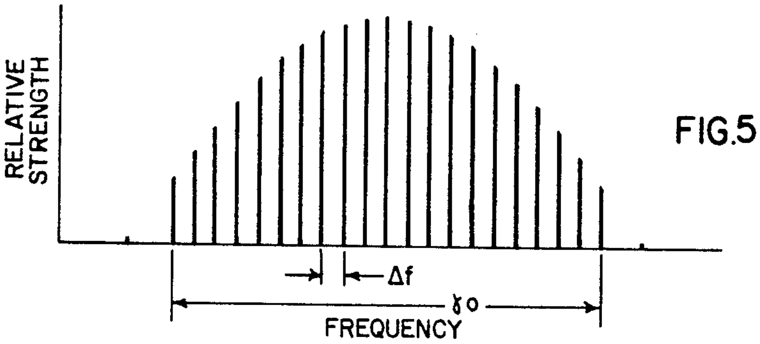
FIG. 5 is a graph showing the frequency spectrum of a mode locked CW laser used in the practice of this invention.

The phase modulation source 31 may be an oscillator or the phase modulation may be effected by feedback as shown in FIGS. 4*a* and 4*b* and 5 page 60 Boyden. Radiation from the rod 21 is passed through the end reflector 23 to a photo detector (not shown in this application). The output of the detector is fed back to the modulator 29 suitably amplified through a variable phase shifter which sets the phase so that the circuit to resonates at the axial mode spacing frequency. Elaboration as shown in FIG. 5 of Boyden may be included.

The characteristics of the laser emission under mode locked conditions are as follows: The emitted pulse width is approximately equal to the reciprocal of the fluorescent line width in Hertz of the laser medium; the peak power output is equal to *n* times the average power output when the laser is not mode locked where *n* is the number of axial resonator modes which are mode locked; and the pulse repetition frequency is approximately equal to the axial mode spacing frequency of the laser resonator. The average power output is approximately the same for both mode locked and non-mode locked operation. In the mode locked mode, generator 15 generates extremely short duration optical pulses because the fluorescent line width extends into the gigahertz region; in the region of $10^9$ Hertz.

Figure 6:
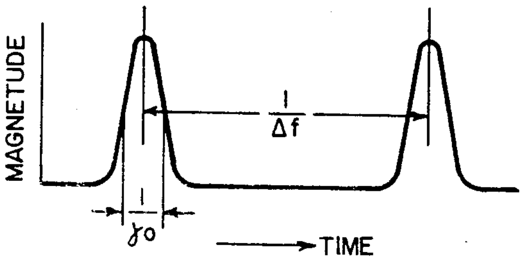
FIG. 6 is another graph showing the properties of the pulses produced by a mode-locked CW laser.

FIG. 5 shows a spectrum of a mode-locked CW laser. Strength of the spectial lines is plotted vertically and frequency horizontally. The extent of the lines, $\gamma 0$, is equal to the frequency width of the fluorescent line of the laser. The duration of each of the optical pulses is $1/\gamma 0$. In a typical situation, the fluorescent line extends over a range of about 0.033 angstroms. For the purpose of explanation it may be assumed that the fluorescent line has a wavelength of 5,000 angstroms and that the fluorescent line width is 0.033 angstroms. The frequency width of the line is given by $$\Delta F = \Delta \lambda \; C/\lambda \; 2$$

where $F$ is the frequency, $\lambda$ the wavelength and $C$ the velocity of light. With the above data $\Delta F = 0.033 \times 10^{-8} \times 3 \times 10^{10}/25 \times 10^{10}$ $= 4 \times 10^9$ Hertz $1/\Delta F = \frac{1}{4} \times 10^{-9} = 2.5 \times 10^{-10}$ Second The pulse repetition frequency is $1/\Delta F$ where $\Delta F$ is the spacing between pulses. The relationships between successive pulses of phase-locked laser is shown in FIG. 6 in which magnitude is plotted vertically and time horizontally.

The beam-splitter assembly 17 (FIG. 2) includes a plurality of light-beam-splitters identified generally by the numeral 33. Each of the beam splitters 33 transmits a part of the radiation impinging on its surface and reflects the remainder of the radiation. The beam splitters 33 may be half-silvered mirrors or full reflectors perforated to transmit a part of the beam. Each beam splitter 33 is typically disposed at an angle of 45° to the incident beam so that the reflected beam is at right angles to the incident beam. The beam-splitter assembly converts the beam 35 from the generator 15 into a plurality of sub-beams identified generally by the numeral 37 with letters to identify specific sub-beams. The pulses delivered by the generator 15 is thus converted into sub-pulses, each sub-pulse passing through an imaginary plane perpendicular to the beams 37 at an instant determined by the length of its path; that is, essentially by the number of beam splitters by which it has been reflected.

Typically the first beam splitter 33*a* impinged by beam 35 transmits a beam 37*a* and reflects a beam 37*b*. The next beam splitter 33*b* reflects part of the beam 37*b* to produce beam 37*c* parallel to 37*a* and beam 37*d* perpendicular to beam 37*c*. The pulse of beam 37*c* is delayed with reference to the pulse of 37*a* by the time taken by light to travel from 33*a* to 33*b*. If this path between 33*a* and 33*b* is 3 centimeters long, the delay is $10^{-10}$ second. A path of 30 centimeters (about 1 foot) produces a delay of $10^{-9}$ second. It should be realized that these intervals are only 1/100 or 1/10 times the period of source 31 which has a reciprocal period the same as the beam scanning frequency used in the receiver.

Figure 2:
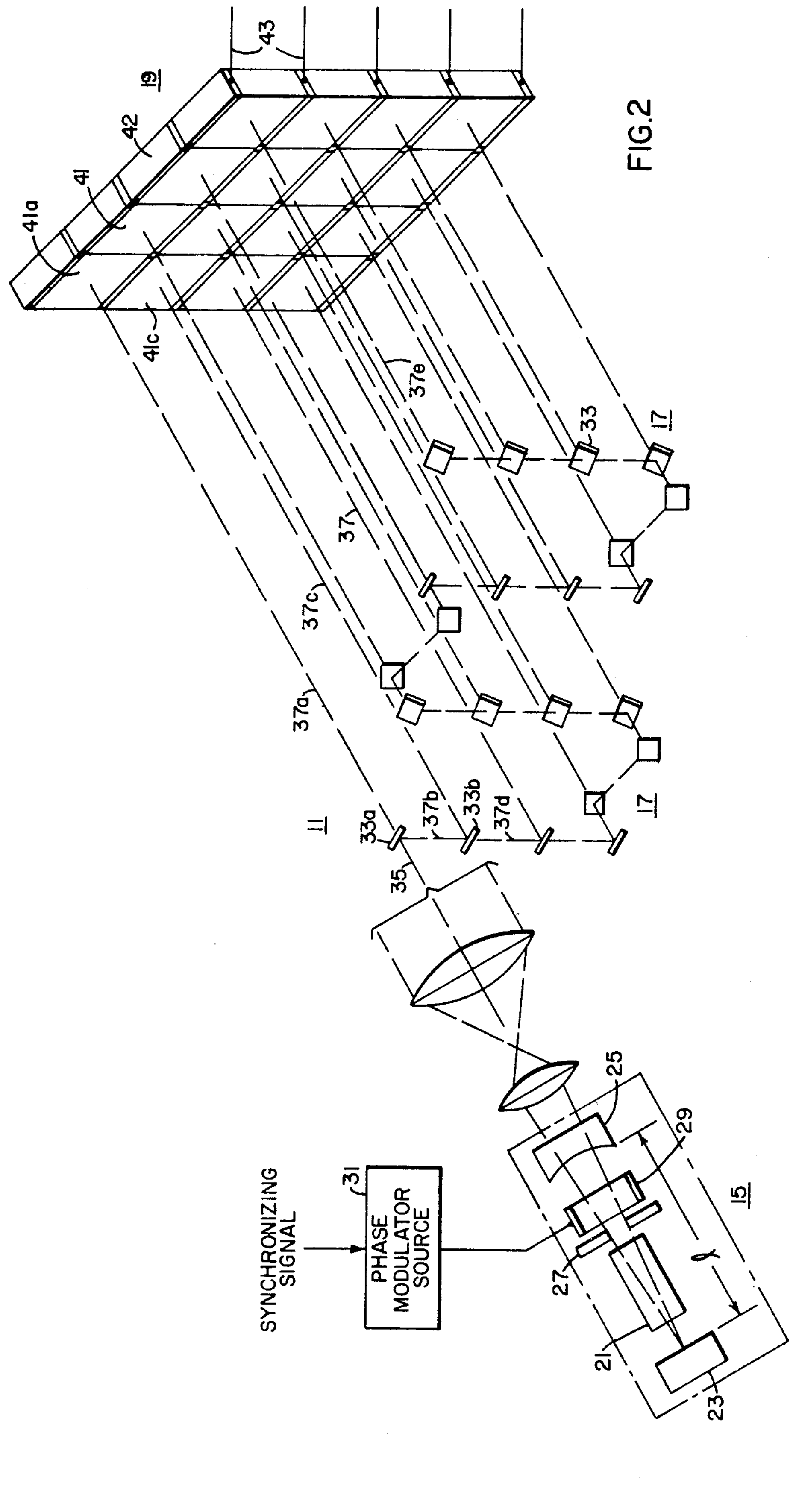

As shown in FIG. 2 16 successively delayed sub-beams are produced. The 16th beam 37*e* is comprised of sub-pulses which possess the greatest time delay with respect to the sub-pulses 37*a*. Typically the beam-splitters 33 may be equally spaced one from the other. In a beam splitter assembly 17 in which the beam splitters 33 are spaced 3 cm. the splitters 33 would cover an area of 9 cm.; spacing of about 1 foot the beam splitters would cover an area 3 feet by 3 feet.

The generator 15 produces a linearly polarized beam. If desired a linear polarizer (not shown) may be included at the exit of the generator 15.

The light modulator 19 serves to impress signals on the sub-beams 37 and includes a plurality of electro-optic cells, generally identified by the numeral 41, specific cells being identified by the numeral 41 and a letter. Each cell 41 is made up of a pair of electro-optic crystals as disclosed in Wentz (for example electro-optic crystals 10 and 11 of Wentz 3,429,636) with facilities for impressing an electric potential across two crystals along the Z axis. As taught by Wentz the effect of the electric potential is to introduce phase difference in the orthogonal electric-vector components of the radiation passing through the cells. The cells 41 are mounted in a bank with their voltage plates 42 electrically insulated from each other, so that a sub-beam 37 impinges in each cell. Sub-beam 37*a* is incident on cell 41*a*, sub-beam 37*c* on cell 41*c*, sub-beam 37*e* on cell 41*e* and so on. The cells 41 are provided with conductors 43 through which voltage is impressed. Typically the voltage is impressed selectively on certain cells 41 and not on others and is of such magnitude that, where the voltage is impressed, the impinging or incident beam remains linearly polarized but the plane of polarization is altered by 90°. Those cells 41 on which a voltage is impressed may be regarded as having a digital "1" impressed thereon while the other cells 41 may be regarded as having a digital "0" impressed thereon. Each pulse 35 is thus converted into a time-sequence of sub-pulses 37 each pulse in its turn having a digital value of "1" or "0." It is understood that other modes of modulating the sub-pulses may also be adopted. For example, a pattern of signals may be produced by circular or elliptical polarization of the sub-beams 37 selectively or by different polarization of the sub-beams.

Figure 3:
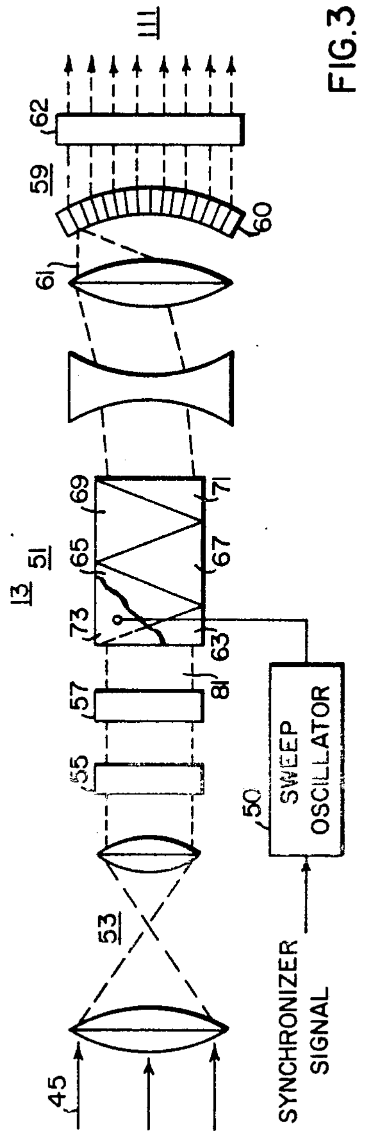
FIGS. 2 and 3 together constitute a diagrammatic view of a transmitter and a receiver respectively of the apparatus shown in FIG. 1.

The modulated sub-beams 45 are transmitted to receiver 13. While these beams are highly coherent, they are to an extent conical. At a sufficient distance from the transmitter, the sub-beams 45 overlapped because of this finite divergence of each beam. To use a demodulation bandwidth at the receiver 13 which is the same as the transmitter modulation bandwidth of M hertz, the time distribution of the received laser signal 45 must be converted to a spatial distribution. This is accomplished as shown in FIG. 3 by an electro-optical beam scanner 51 operating in synchronism with the transmitted signal. The beam deflection provided by the scanner results from an electrically induced gradient in the index of refraction of an electro-optic prism array through which the laser beam is propagating. The gradient in reflective index of the scanner 51 is linearly related to the applied electric field. Synchronism with the transmitter is obtained by transmitting a synchronization pulse (derived from the mode locking phase modulator source 31) interposed between the transmissions of the signal from the modulator 19.

The receiver 13 includes an addition to the scanner 51, a sweep oscillator 50 for actuating the scanner 51, lens system 53 for focusing the beam 45, a filter 55 for excluding stray light and a polarizer 57. There is also a detector 59, an array of radiation responsive devices 60, for example, S–20 photomultipliers which are scanned by the beam 61 deflected by the scanner 51. The signals from the devices 60 are supplied through a threshold network 62. The sweep oscillator 50 is locked into synchronism with the phase modulator source 31 by signal from the source 31.

Figure 1:
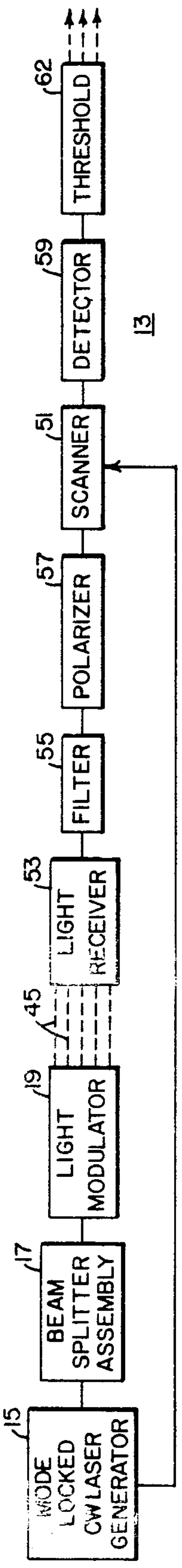
FIG. 1 is a block diagram showing an embodiment of this invention.

A scanner 51 for producing a linear sweep of the beam 61 is shown in FIGS. 1, 4*a* and 4*b*. The scanner 51 includes a plurality of prisms 63, 65, 67, 69, 71 formed of crystals of materials which manifest the linear electro-optic effect (known as the Pockels effect). The material may be potassium dehydrogen phosphate or potassium dideuterium phosphate. The prisms 63 through 71 are mounted with their inclined surfaces abutting between electrically conductive plates 73 and 75 connected to oscillator 50. The oscillator 50 applies deflecting potential to the plates.

While the electro-optic effect, as applied to the electro-optic cells 41 is described in detail in Wentz, it is desirable, in the interest of completeness to describe this effect as applied to the scanner 51.

The electro-optic effect is a result of a change in birefringence in crystals of the materials mentioned above when subjected to an electric field. Materials exhibiting the effects are characterized by the Fresnel index ellipsoid which has axes which are proportional to the indexes of refraction in the anisotropic medium. In general, $$x^2/n_x^2 + y^2/n_y^2 + z^2/n_z^2 = 1$$

where $x$, $y$, and $z$ are the cartesian axes of the index ellipsoid and $n_x$, $n_y$, and $n_z$ are the principal indexes of refraction for light linearly polarized parallel to $x$, $y$, and $z$ axes respectively. In crystals exhibiting the effect, the principal indexes of refraction can be altered by applying an electric field to the crystal.

In uniaxial electro-optic crystals, characterized by having $n_x = n_y = n_o$ and $n_z = n_e$ where $n_o$ and $n_e$ are the ordinary and extraordinary index of refraction, respectively, the incremental change in index of refraction for light polarized parallel to the X or Y axis when an electric field is applied parallel to the Z (or optic) axis is given by $$\Delta\, n = r_T\, n_o^3\, V_z/2d \qquad (1)$$

where $r_T$ = temperature dependent electro-optic constant of the crystal for an electric field applied parallel to the Z axis in meters per volt $V_z$ = magnitude of applied voltage in volts $d$ = thickness of crystal along the Z axis in meters The refractive indexes $n_x$, $n_y$, and $n_z$ are altered as follows:

$$n_x = n_o \pm \Delta\, n$$

$$n_y = n_o \pm \Delta\, n$$

$$n_z = n_e,$$

where the polarity of the incremental index change depends upon the polarity of the applied electric field with respect to the Z axis.

With reference to FIGS. 4*a* and 4*b*, the electro-optic prisms 63, 65, 67, 69, and 71 are arranged to obtain an alternation in refractive index as seen by a light beam 81 linearly polarized in the plane of the figure. The prisms 63 to 71 are oriented so that the Z or optic axis of each crystal is perpendicular to the plane of the figure and with the X axis of the index ellipsoid parallel to the polarization of the incident light beam on prisms 63, 67, and 71 and Y axis of the index ellipsoid parallel to the polarization of the incident light beam on prism 65 and 69. With this configuration, continuous electrodes 73 and 75 can be applied to both faces of the array normal to the Z axis, and an alternating index of refraction is realized when a potential difference is applied to the Z axis fact electrodes. The polarity of the applied voltage with respect to the array electrodes determines the state of the index of refraction alternation. For a particular voltage polarity, the refractive index of prism 63, 67, and 71 has the value $n_1 = n_o + \Delta\, n$, and of prisms 65 and 67 a value of $n_2 = n_o - \Delta\, n$. The opposite voltage polarity produces $n_1 = n_o = \Delta\, n$ in prisms 63, 67, 71 and $n_2 = n_o + \Delta\, n$ in prisms 65, 69.

With reference to FIGS. 4*a* and 4*b* a light beam 81 incident upon the aperture of the array and linearly polarized parallel to the plane of the figure is deflected in an upward direction if $n_2 > n_1$ and in a downward direction if $n_1 > n_2$. No deflection occurs if $n_1 = n_2 = n_o$. Beam deflection occurs at the interfaces of prisms 63 and 65, 65 and 67, 67 and 69, and 69 and 71 when a difference in index of refraction exists at the boundary and the angle through which the light beam is deflected can be determined from Snell's law of refraction. Analysis of the iterated prism scanner yields a total deflection angle $\phi$given by $$\phi = 2\ \Delta n L/h \text{ radians} \qquad (2)$$

where $L$ = scanner length $h$ = prism height

Substituting the value for $\Delta\, n$ given by equation (1) into equation (2) yields $$\phi = L\ r_T\ n_o^3 V_z/hd \qquad (3)$$

The physical configuration of the beam scanner must be such that at maximum deflection the most efficient use of the prism array 51 is obtained; a condition which exists when the full exit aperture of the prism is utilized. Geometrical analysis of the prism scanner shows that the scanned beam appears to emanate for a distance of L/2 from the exit aperture. This is also true for a multitude of prism interfaces in which case the trajectory of the deflected beam approximates the arc of a circle. Based upon the virtual source distance L/2 from the exit aperture an incident light beam with diameter, D, less than the prism height, $h$, and centered on the beam deflector axis, the maximum length, L, of the prism array which allows full use of the exit aperture is $$L = n_o(h-D)/\phi \quad (4)$$

The number of resolvable beam positions, R, for a given scan angle and input beam divergence, $\theta$, is given approximately by $$R = 2\,\phi/\theta \quad (5)$$

and for diffraction limited operation, $R$ is given by $$R = 2\,\phi\,D/1.22 \quad (6)$$

Solving equation (2) for L and equating this value to that given by equation (4) and solving the resulting equation for $\phi$ yields $$100 = [\ 2\,\Delta n\ n_o\,(h-D)/h\ ]\ ½ \quad (7)$$

Substituting equation (7) into equation (6) yields $$R = \frac{2D\left[\frac{2\Delta n n_0(h-D)}{h}\right]^{1/2}}{1.22\lambda} \quad (8)$$

Equation (8) exhibits a maximum value of $h$ with respect to D for a given D. This value is given by $$h = (3/2)\ D \quad (9)$$

With this value for $h$, equation (8) reads $$R_{max} = \frac{2D\left[\frac{2\Delta n n_0}{3}\right]^{1/2}}{1.22\lambda} \quad (10)$$

Figure 7:
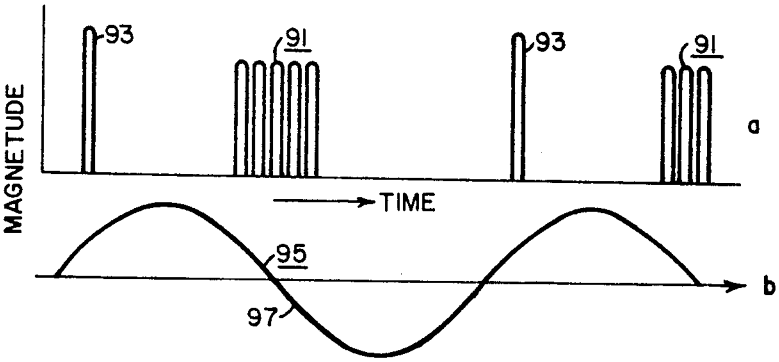

FIGS. 7*a* and 7*b* are graphs showing the manner in which the scanning voltage is applied by the oscillator 50 to the scanner 51. In each graph time is plotted horizontally and magnitude vertically. Points along a vertical line parallel to the magnitude axes represent the same instant of time. In FIG. 7*a* the peaked loops 91 which are bunched represent timed-successions of sub-pulses received from the modulator 19 and the single loops 93 represent the synchronizing signals from the source 31 to oscillator 50. In FIG. 7*b* the wave 95 represents the oscillations produced by the oscillator 50 which typically have a frequency of $10^8$ Hertz. The pulses 93 lock in the wave 95. The oscillator 50 is grated so that it impresses a deflecting signal on the plates 73 and 75 during the substantially linear portions 97 of the wave and during the corresponding intervals the sub-pulses 91 are transmitted through the scanner 51. The scanning converts the time sequence of the sub-pulses into a spatial distribution. The angular rate of scan and the positioning of the photo-sensitive devices 60 are so related to operation of the beam splitter assembly 17 that the sub-pulses are successively impressed on the devices 60 in sequence. To achieve the appropriate relationship the timing of the synchronizing pulses 93 is adjustable and is properly set.

The conversion of the time sequence of sub-pulses into a spatial sequence is crudely shown in FIG. 8. In this view the dots 101 represents a succession of sub-pulses. These dots 101 are fanned out into an arc of pulses 103 by the scanning.

As the detector 159 is scanned it converts the radiation signals received by the photo-multipliers 60 into electrical signals which pass through the threshold unit 62 in separate channels 111 and are utilized.

In the apparatus shown in FIG. 2 the conversion from a timed succession of pulses to a spatial succession of pulses takes place by linear scanning. The scanning may also be two-dimensional and may be coordinated with the two-dimensional light modulator 19. FIG. 9 shows a two dimensional scanner 120 and FIG. 10 a two dimensional detector 141.

The apparatus shown in FIG. 9 is a scanner 120 including a vertical scanning array 121. This array 121 includes a plurality of prisms 123 with their inclined surfaces abutting. There is also a horizontal scanning array 125 including a plurality of prisms 127 with their inclined surfaces abutting a half-wave plate 129 is interposed between the arrays 121 and 125. The array 121 is provided with horizontal plates 131 for impressing potential and the array 125 with the vertical plates 133 for impressing potential.

The half-wave plate 129 between the vertical and horizontal arrays 121 and 125 is necessary for obtaining the correct beam polarization in the horizontal prism array 125. The horizontal prism array 125 must possess a slightly larger cross-sectional area than the vertical array 121 to accommodate the vertical beam deflection. By proper choice and phasing of the driving voltages supplied these conductors 137 and 139 any desired scan pattern may be realized.

The two dimensional detector 141 includes photo-multipliers 143 disposed in the configuration of a spherical segment. The scanner 120 may be activated to scan each vertical row of the detector 141 in its turn; the horizontal array 125 being controlled to move the scanning from row to row.

A variety of electro-optical materials are available for use in the iterated prism scanners 51 and 120. For laser sources in the spectral region extending in wavelength from 0.4 to 1.0 micrometer, the electro-optic material Potassium Dideuterium Phosphate ($KD_2PO_4$) appears most suitable. $KD_2PO_4$ is grown with exceptional optical quality, its electro-optic effect is linear with applied field, when operated near its curie temperature indexed refractive index change of one part in $10^3$ can be obtained with practical values of electric field, it can be easily index matched to reduce interface reflection losses, and it is readily available.

To illustrate the capability of an iterated $KD_2OP_4$ beam scanner, a particular scan requirement was analyzed and the results are shown in the following table:

| | |
|---|---|
| Laser Wavelength | = 1.06 micrometer |
| Beam Divergence Prior to Scan | $\theta_r$= 0.2 milliradian |
| Resolution Elements Per Line | R = 100 |
| Scanner Length | 26 centimeters |
| Scanner Aperture | 1 cm × 1 cm |

| | |
|---|---|
| Input Beam Diameter | 0.65 centimeter |
| Deflection Voltage for Maximum Beam Deflection | 5 kilovolts |
| Scanner Operating Temperature | 240°K |

Since two tandom prism arrays 121 and 125 are necessary for two axis scanning, the second array must possess a slightly larger aperture size to encompass the deflected beam from the first array.

The electric load presented by a scanner array 51 or 121 and 125 to the deflection circuitry consists mainly of a capacitive reactance and capacitance of which can be approximated by the standard formula for the parallel plate capacitor $$C = E_o\ E_r\ A/d \text{ farad}$$

where $E_o$ = permittivity of space $E_r$ = dielectric constant of the electro-optic material $A$ = area of electrodes $d$ = electrode spacing To illustrate the capacity of the above described laser communications system, the transmitter power requirement for a given set of system parameters will be determined. The following system parameters are assumed:

Bit Rate = $10^9$ bits per second

Transmitter-Receiver Bandwidth, $B$ = 100MHz

Post Detection Signal to Noise Ratio, $S/N = 10$

Receiver Aperture, $A_r = 10^{-1}$ MTR$^2$ (square meters)

Receiver Optical Bandwidth, $\Delta\lambda$ = 10 angstroms

Receiver Field of View, $\Omega_r = 10^{-6}$ steradian

Transmitter Beam Width, $\theta_t$ = 1 milliradian

Range, $R_A$ = line of sight

To obtain $10^9$ bits per second a 10 channel detector 19 with $10^8$ bits per channel is required. A bit rate of $10^9$ also requires that the emitted laser pulse be less than 1 nanosecond ($10^9$) in duration. From the standpoint of detection sensitivity the CW Argon laser (15) provides a wavelength of approximately 5,000 angstroms which is near the peak of the S–20 photocathode (60) spectrum response. This laser has also been operated mode locked at a 100MHz repetition rate with an individual pulse width of approximately 0.25 nanosecond. The remaining system parameters are as follows:

Laser Wavelength, $\lambda$ = 5,000 angstroms

Detector 59, S-20 Multiplier Phototube 60 (RCA 4459)

Background Spectral Radiance, $C(\lambda) = 3 \times 10^{-2}$ watts/ster/A/MTR$^2$ at 5,000 angstroms $C(\lambda)$ is given for 100 percent diffuse sunlight reflection from an object in the field of view of the receiver.

The background power, $P_b$, incident upon the receiver aperture is $P_b = C(\lambda)\ \Omega_r\ A_r\ \Delta\lambda$ watt For 10 channels, the background noise per channel is $P_{bc} = P_b/10 = C(\lambda)\ \Omega_r\ A_r\ \Delta\lambda/10$ watt Substituting the pertinent parameters $P_{bc} = (3 \times 10^{-2})\ (10^{-6})\ (10^{-1})\ (10^1) = 3 \times 10^{-9}$ watt/channel The RCA 4459 MPT has the following specifications at = 5,000 angstroms:

NEP = noise equivalent power = $10^{-15}\sqrt{B}$ $\eta$ = quantum efficiency = 0.1

For a detection bandwidth of 100 MHz the NEP is equal to $10^{-11}$ watt. The post detection signal to noise ratio is given by $$S/N = [\ \eta\ P_r^2/2Bh\nu\ (P_{bc} + NEP + P_r)]$$

where $P_r$ = received signal power, watt $\nu$ = optical frequency Hz $h$ = *Planck's constant*

Solving for $P_r$ assuming $S/N = 10$, the receiver power per channel must be $P_r = 10^{-7}$ watt/channel and for 10 channels, $P_r = 10^{-6}$ watt.

For a CW power output of an Argon laser of 10 watts, a total system loss of 70 db can be tolerated. In a line of sight optical communications system the losses include atmospheric attenuation, $1/R_A^2$ transmission losses, and losses in optical elements. The last of these losses can be conservatively estimated at 20 db for the combined transmitted and receiver. For a one mile path the $1/R_A^2$ losses amount to approximately 25 db. This leaves 25 db available for atmospheric losses and any additional losses.

I claim:

1. Communication apparatus including a source of pulses of radiant energy, an array of beam splitters, successively interposed in the path of said radiant energy, subdividing each of said pulses into a plurality of sub-pulses, said sub-pulses occurring in a predetermined timed succession dependent on the spacing along the path of said radiant energy between said beam splitters, an array of electro-optic cells interposed in the path of said sub-pulses, each sub-pulses of each pulse impinging on a cell of said array, means connected to each said cells for impressing intelligence on its associated sub-pulse, each cell emitting a sub-pulse modulated by said intelligence, and receiver means, spaced from said cells but in communication with said emitted sub-pulses, said receiver means being spaced a distance from said cells such that over said distance the sub-pulses emitted by said cells are converged into a single beam with the modulated sub-pulses spaced in succession along said single beam in the order in which they emerge from said cells, the said receiver means including means actuating said single beam to convert said emitted sub-pulse occurring in timed succession in said single beam into sub-pulses occurring in spatial succession, and means responsive to said sub-pulses in spatial succession for deriving the said intelligence impressed on said sub-pulses.

2. The apparatus of claim 1 including means for synchronizing the source with the actuating means.

3. The apparatus of claim 1 wherein the means responsive to the sub-pulses in spatial succession includes a plurality of responsive elements spaced along a single dimension, and wherein the actuating means includes line-scanning means for causing the sub-pulses occurring in spatial succession to scan said responsive elements along said single dimension, the spacing of said elements being so correlated to the time intervals between said sub-pulses in timed succession that each element responds to a sub-pulse of said timed succession.

4. An intelligence communication system including a CW laser source, means for mode-locking said source to produce a train of optical pulses, means for converting each said mode-locked pulse in said train into a burst of spatially and time separated sub-pulses, means for impressing intelligence on said sub-pulses, said modulated sub-pulses being emitted from said intelligence impressing means, means, spaced from said intelligence impressing means, for receiving the sub-pulses having intelligence impressed thereon, said receiver means being spaced a distance from said intelligence impressing means such that, over said distance, the sub-pulses emitted by said intelligence impressing means are converged into a single beam with the sub-pulses spaced in succession along said single beam in the order in which they emerge from said intelligence impressing means, means synchronized with the burst of sub-pulse and responsive to the time separation between said received sub-pulses for space separating said received sub-pulses and means for deriving said intelligence from said received space-separated sub-pulses.

5. The apparatus of claim 4 wherein the space separating means includes an array of contiguous electro-optic prisms on which the single beam impinges and also includes means for impressing potentials on said prism to cause said beam to be deflected over a spatial path.

6. The method of communicating digital intelligence at a high speed of the order of $10^{10}$ digits per second, which comprises converting a beam of radiant energy into a succession of sub-pulses having a timed distribution by progressive increase of the lengths of the paths over which parts of the said beam are transmitted, impressing said digital intelligence on said sub-pulses, transmitting said pulses together over a distance such that the sub-pulses are converged into a single beam with the sub-pulses spaced along said single beam in accordance with the timed distribution receiving said single beam, periodically deflecting the received single beam to convert said timed distribution of sub-pulses into a spatial distribution, and deriving said intelligence sub-pulse by sub-pulse from said spatial distribution.

7. The method of claim 6 practiced with a continuous wave laser, the said method including the step of producing the beam of radiant energy by mode locking said laser thus producing a train of periodically occurring main pulses, each of said last-named pulses being converted into a succession of sub-pulses, the said method also including the step of synchronizing the deflection of the received single beam with the main pulses.

* * * * *